US00RE46892E

(19) United States
(12) Reissued Patent
Bigney et al.

(10) Patent Number: US RE46,892 E
(45) Date of Reissued Patent: Jun. 19, 2018

(54) POUCH FOR MEN'S GARMENT

(71) Applicant: 0912139 B.C. LTD., North Vancouver (CA)

(72) Inventors: Dustin Douglas Bigney, West Vancouver (CA); Shawn Robert Ellis, Kelowna (CA)

(73) Assignee: 0912139 B.C. LTD., North Vancouver (CA)

(21) Appl. No.: 29/577,937

(22) Filed: Sep. 16, 2016

Related U.S. Patent Documents

Reissue of:
(64) Patent No.: Des. 646,462
Issued: Oct. 11, 2011
Appl. No.: 29/382,591
Filed: Jan. 5, 2011

(51) LOC (11) Cl. ..... 02-01
(52) U.S. Cl.
USPC ..... D2/712; D2/738; D2/742
(58) Field of Classification Search
USPC ..... D2/700, 701, 705, 711, 712, 713, 716, D2/731, 734, 737, 738, 742, 853; D24/122, 124, 125, 126, 127; D29/101.5
CPC ..... A41B 9/002; A41B 9/007; A41B 9/02; A41B 9/023; A41B 9/026; A41B 9/00; A61L 15/22; A61L 15/58; A61F 13/15; A61F 13/47; A61F 13/49; A61F 13/55; A61F 13/58; A61F 5/4401; A41C 1/00; A41C 1/02; A41D 1/08; A41D 13/0525; A41D 13/0537; A63B 71/12; A63B 71/1216; A63B 71/1225
See application file for complete search history.

(56) References Cited

U.S. PATENT DOCUMENTS 642,227 A * 1/1900 Reis ..... A41B 9/08 2/78.2
847,779 A * 3/1907 Jarrett ..... A61F 5/40 602/70
1,020,588 A * 3/1912 West ..... A61F 5/40 602/70
1,592,732 A * 7/1926 Friedman ..... A61F 5/40 2/404
1,688,910 A * 10/1928 Winship ..... A41B 1/04 2/78.1

(Continued)

*Primary Examiner* — Darlington Ly
(74) *Attorney, Agent, or Firm* — Kilpatrick Townsend and Stockton

(57) CLAIM

The ornamental design for pouch for men's garment, as shown and described.

DESCRIPTION

FIG. 1 illustrates a perspective view of a pouch for men's garment.
FIG. 2 illustrates a front view thereof.
FIG. 3 illustrates a rear view thereof.
FIG. 4 illustrates a side view thereof.
FIG. 5 illustrates the opposite side view of FIG. 4.
FIG. 6 illustrates a top view thereof; and,
FIG. 7 illustrates a bottom view thereof.
The pouch for men's garment has a protruding pouch and a flap defining a keyhole opening into the pouch. The pouch may be embodied in various types of men's garments, particularly in a mid-section of a front wall of men's underwear and other men's garments worn around a man's torso.
The broken-line showing of a men's garment illustrates portions of the article that form no part of the claimed design.

1 Claim, 4 Drawing Sheets

Figure 1:
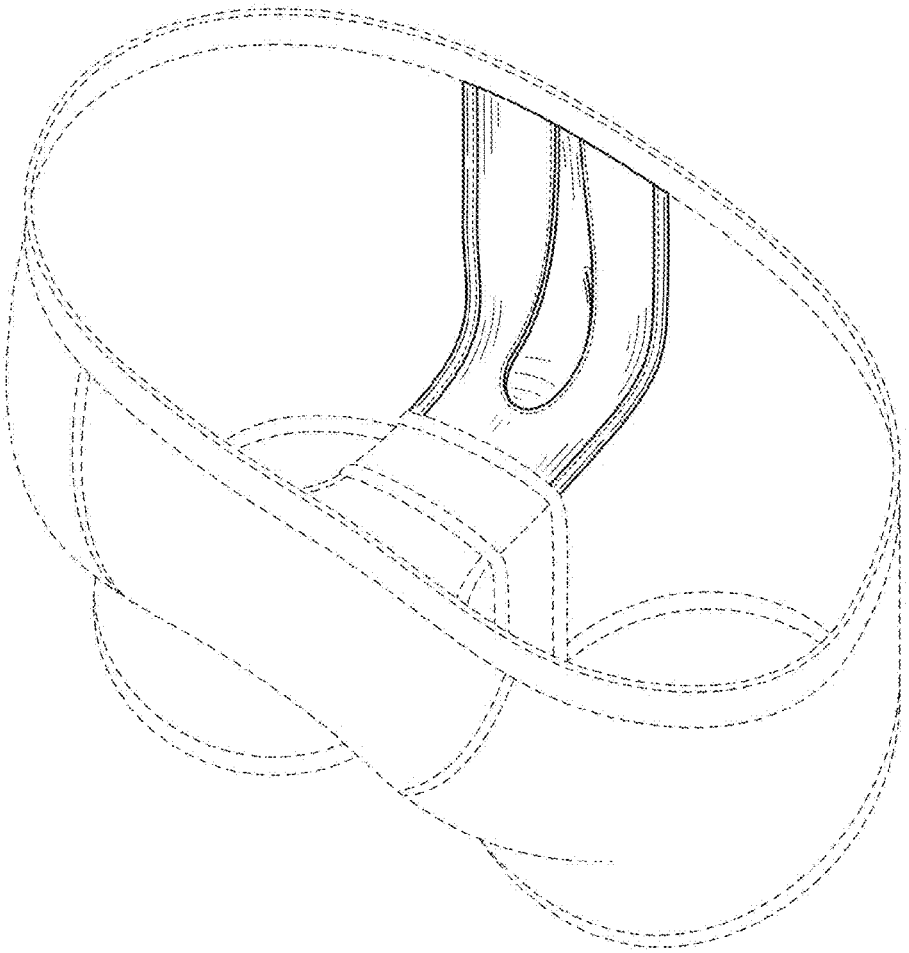
Figure 2:
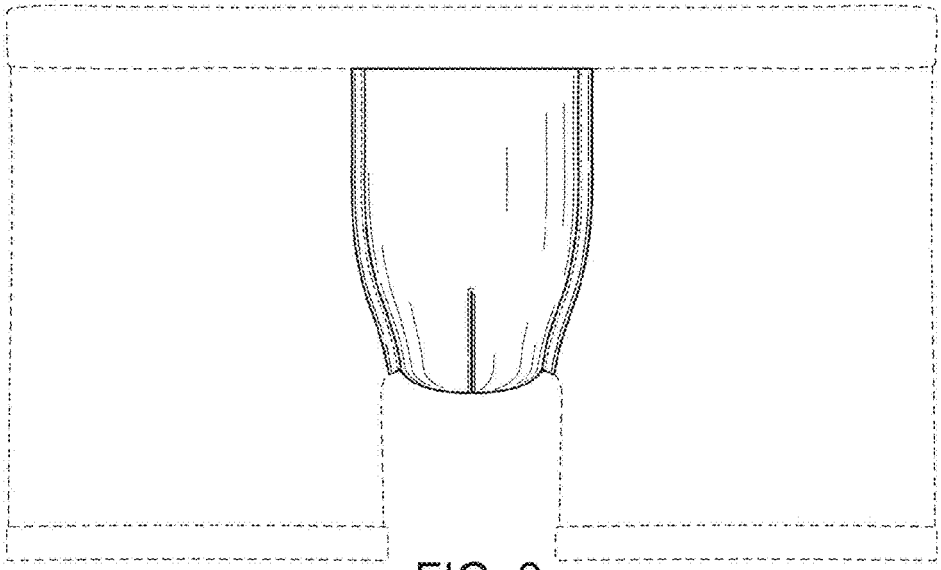
Figure 3:
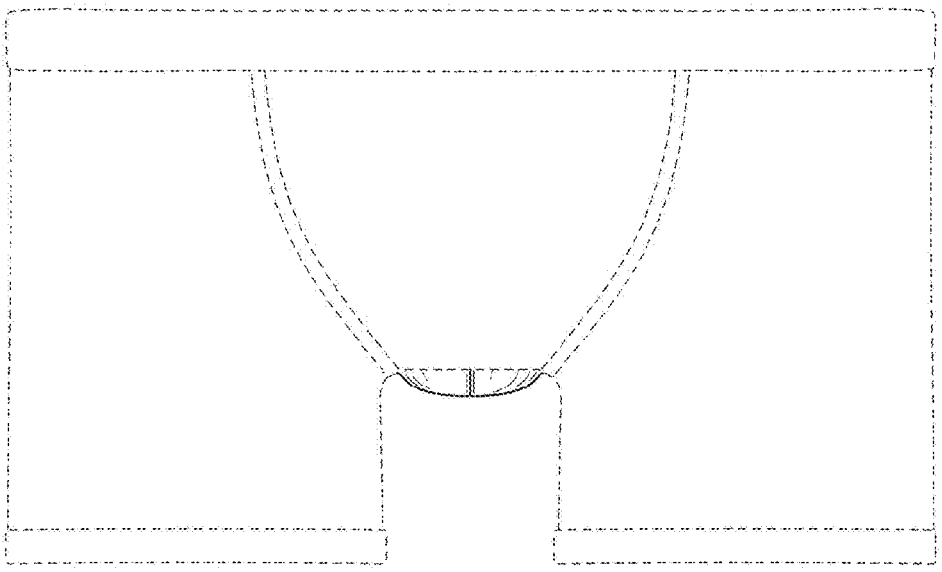
Figure 4:
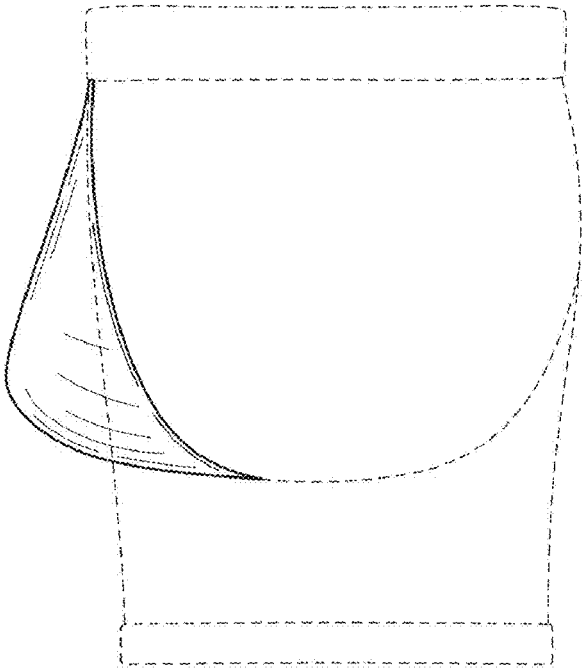
Figure 5:
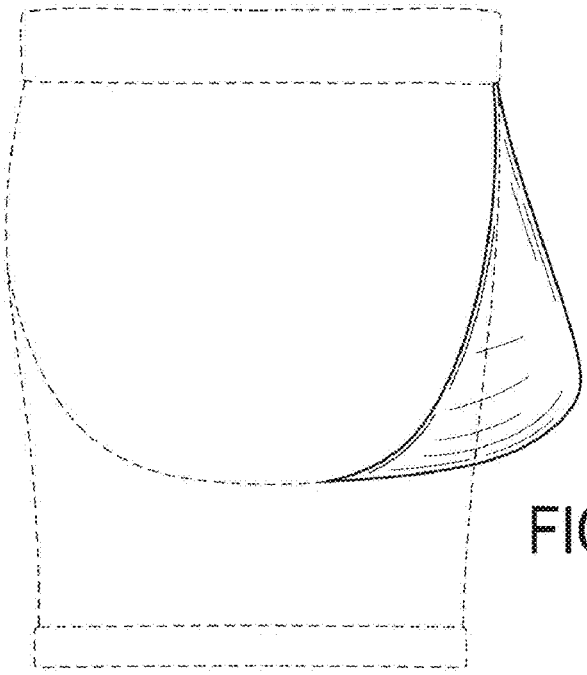
Figure 6:
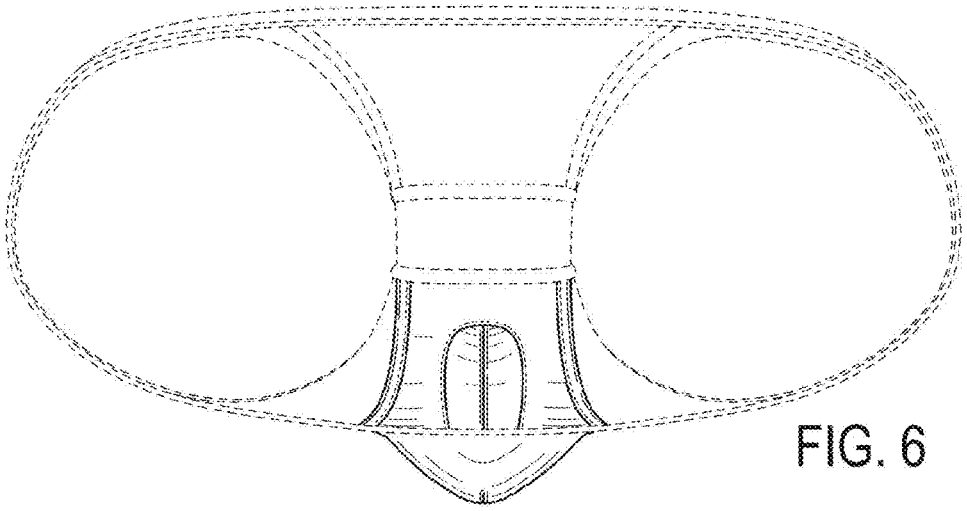
Figure 7:
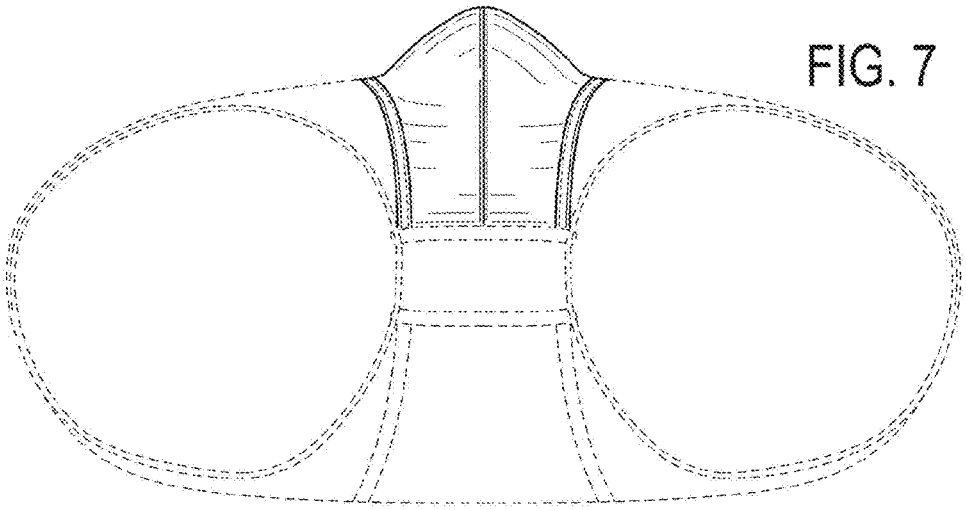

Matter enclosed in heavy brackets [ ] appears in the original patent but forms no part of this reissue; matter printed in italics indicates the additions made by reissue.

(56) References Cited

U.S. PATENT DOCUMENTS 2,235,849 A * 3/1941 Reis ..... A41B 9/02 2/234
2,457,260 A * 12/1948 Morris ..... A41B 9/04 602/67
2,529,115 A * 11/1950 Thalman ..... A41C 1/02 450/105
2,639,708 A * 5/1953 Chatfield ..... A41B 9/06 2/401
3,207,155 A * 9/1965 Casey ..... A41B 9/02 2/403
3,517,666 A * 6/1970 Atlee ..... A41B 9/02 2/403
4,870,958 A * 10/1989 Webster ..... A41B 9/023 128/891
5,647,065 A * 7/1997 Richerson ..... A41B 9/023 2/227
5,651,144 A * 7/1997 Li ..... A41B 9/02 2/403
5,754,982 A * 5/1998 Gainer ..... F41H 1/02 2/102
D482,123 S * 11/2003 Jaquez ..... D24/190
7,895,676 B2 * 3/2011 Clark ..... A41B 9/02 2/403
D716,524 S * 11/2014 Astin ..... D2/712
D716,525 S * 11/2014 Astin ..... D2/712
D735,444 S * 8/2015 Harris ..... D2/712
D748,893 S * 2/2016 Astin ..... D2/712
D748,894 S * 2/2016 Astin ..... D2/712
D753,368 S * 4/2016 Astin ..... D2/712
D756,067 S * 5/2016 Astin ..... D2/712
D756,068 S * 5/2016 Astin ..... D2/712
D756,069 S * 5/2016 Astin ..... D2/712
D759,344 S * 6/2016 Astin ..... D2/712
D759,345 S * 6/2016 Astin ..... D2/712
D760,994 S * 7/2016 Astin ..... D2/712
D760,995 S * 7/2016 Astin ..... D2/712
D761,519 S * 7/2016 Astin ..... D2/712
D763,547 S * 8/2016 Astin ..... D2/712
9,687,030 B2 * 6/2017 Bigney ..... A41B 9/023
9,713,348 B2 * 7/2017 Astin ..... A41B 9/02
D799,153 S * 10/2017 Astin ..... D2/712
2004/0154079 A1 * 8/2004 Rana et al. ..... A41B 9/04 2/406
2007/0277285 A1 * 12/2007 Gravette et al. ..... A41B 9/023 2/78.1

* cited by examiner